(12) United States Patent
Biskeborn et al.

(10) Patent No.: US 8,553,352 B2
(45) Date of Patent: Oct. 8, 2013

(54) MAGNETIC TAPE HEAD HAVING LUBRICANT IN RECESSED PORTIONS OF A TAPE BEARING SURFACE THEREOF, AND SYSTEMS HAVING THE HEAD

(71) Applicant: International Business Machines Corporation, Armonk, NY (US)

(72) Inventors: Robert G. Biskeborn, Hollister, CA (US); Jason Liang, Campbell, CA (US); Calvin S. Lo, Saratoga, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/758,711

(22) Filed: Feb. 4, 2013

(65) Prior Publication Data

US 2013/0148237 A1   Jun. 13, 2013

Related U.S. Application Data

(63) Continuation of application No. 12/916,341, filed on Oct. 29, 2010, now Pat. No. 8,416,527.

(51) Int. Cl.
*G11B 5/187* (2006.01)

(52) U.S. Cl.
USPC ........................................................ 360/75

(58) Field of Classification Search
USPC ........................................................ 360/75
See application file for complete search history.

(56) References Cited

U.S. PATENT DOCUMENTS

| | | | |
|---|---|---|---|
| 4,894,737 A | 1/1990 | Hamana et al. | |
| 5,065,500 A | 11/1991 | Yoneda et al. | |
| 5,173,820 A * | 12/1992 | Yoneda | 360/291.6 |
| 5,969,912 A | 10/1999 | Cope | |
| 6,122,147 A | 9/2000 | Fahimi et al. | |
| 6,677,105 B2 | 1/2004 | Wang et al. | |
| 6,940,686 B2 | 9/2005 | Ohtani et al. | |
| 7,413,819 B2 | 8/2008 | Hattori et al. | |
| 2006/0099461 A1 | 5/2006 | Jones et al. | |
| 2007/0183091 A1* | 8/2007 | Saliba | 360/122 |
| 2008/0305366 A1 | 12/2008 | Hsieh et al. | |
| 2009/0274836 A1 | 11/2009 | Bradshaw et al. | |
| 2009/0310248 A1 | 12/2009 | Hachisuka | |
| 2012/0106003 A1 | 5/2012 | Biskeborn et al. | |

FOREIGN PATENT DOCUMENTS

JP   2002-304706   10/2002

OTHER PUBLICATIONS

Non-Final Office Action from U.S. Appl. No. 12/916,341 dated May 17, 2012.
Final Office Action from U.S. Appl. No. 12/916,341 dated Sep. 4, 2012.
Notice of Allowance and Fee(s) Due from U.S. Appl. No. 12/916,341 dated Nov. 28, 2012.

* cited by examiner

*Primary Examiner* — Mark Blouin
(74) *Attorney, Agent, or Firm* — Zilka-Kotab, PC (57) ABSTRACT

A magnetic tape head according to one embodiment includes a first section having a tape bearing surface (TBS) and portions that are recessed from the TBS; a thin film section coupled to the first section, the thin film section comprising transducers for at least one of reading from and writing to a magnetic tape; and a lubricating layer above at least the first section. Additional systems and methods are also disclosed.

18 Claims, 8 Drawing Sheets

MAGNETIC TAPE HEAD HAVING LUBRICANT IN RECESSED PORTIONS OF A TAPE BEARING SURFACE THEREOF, AND SYSTEMS HAVING THE HEAD

RELATED APPLICATIONS

This application is a continuation of copending U.S. patent application Ser. No. 12/916,341, filed Oct. 29, 2010, which is herein incorporated by reference.

BACKGROUND

The present invention relates to data storage systems, and more particularly, this invention relates to magnetic tape head lubrication methods.

In magnetic tape storage systems, data is read from and written onto magnetic tape media utilizing one or more magnetic tape heads. Data is written on the magnetic tape media by moving the magnetic tape media across the magnetic tape head(s). The magnetic tape head(s) then generate a magnetic field, which encodes the data into the magnetic tape media. Data is read from the tape by similarly positioning the tape over the tape head(s) and then sensing the magnetic field of the tape. Read and write operations may be independently synchronized with the movement of the tape to ensure that the data can be read from and written to the desired location on the tape.

As the tape moves across the head(s), friction between the head(s) and the tape causes wear on the tape and head(s), while static friction, herein referred to as "stiction," reduces the performance of the tape drive due to increased stopping and starting and other factors. In addition, friction and stiction are two phenomena which are currently reducing the durability of magnetic tapes and magnetic heads in magnetic tape drives.

BRIEF SUMMARY

A magnetic tape head according to one embodiment includes a first section having a tape bearing surface (TBS) and portions that are recessed from the TBS; a thin film section coupled to the first section, the thin film section comprising transducers for at least one of reading from and writing to a magnetic tape; and a lubricating layer above at least the first section.

A magnetic head according to another embodiment includes an AlTiC section having a tape bearing surface (TBS) and portions that are recessed from the TBS; and a thin film section coupled to the AlTiC section, the thin film section comprising transducers for at least one of reading from and writing to a magnetic tape, wherein sidewalls of the recessed portions have shapes characteristic of dissolution of material previously positioned therebetween, wherein the material previously positioned between the sidewalls comprises TiC grains of AlTiC, and wherein the TBS of the AlTiC section comprises primarily Al-containing grains.

A method according to one embodiment includes forming recessed portions in one or more surfaces of a magnetic tape head; and applying a first lubricating layer to at least one of the surfaces of the magnetic tape head to at least partially fill the recessed portions.

Any of these embodiments may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of tape-based storage systems, as well as operation and/or component parts thereof.

In one general embodiment, a magnetic tape head includes a first section having a tape bearing surface (TBS) and portions that are recessed from the TBS; a thin film section coupled to the first section, the thin film section comprising transducers for at least one of reading from and writing to a magnetic tape; and a lubricating layer above at least the first section.

In another general embodiment, a magnetic head includes an AlTiC section having a tape bearing surface (TBS) and portions that are recessed from the TBS; a thin film section coupled to the AlTiC section, the thin film section comprising transducers for at least one of reading from and writing to a magnetic tape; and a lubricating layer in the recessed portions of the AlTiC section, wherein sidewalls of the recessed portions have shapes characteristic of dissolution of material previously positioned therebetween, wherein the material previously positioned between the sidewalls comprises TiC grains of AlTiC, and wherein the TBS of the AlTiC section comprises primarily Al-containing grains.

In another general embodiment, a method includes forming recessed portions in one or more surfaces of a magnetic tape head; and applying a first lubricating layer to at least one of the surfaces of the magnetic tape head to at least partially fill the recessed portions.

Figure 1:
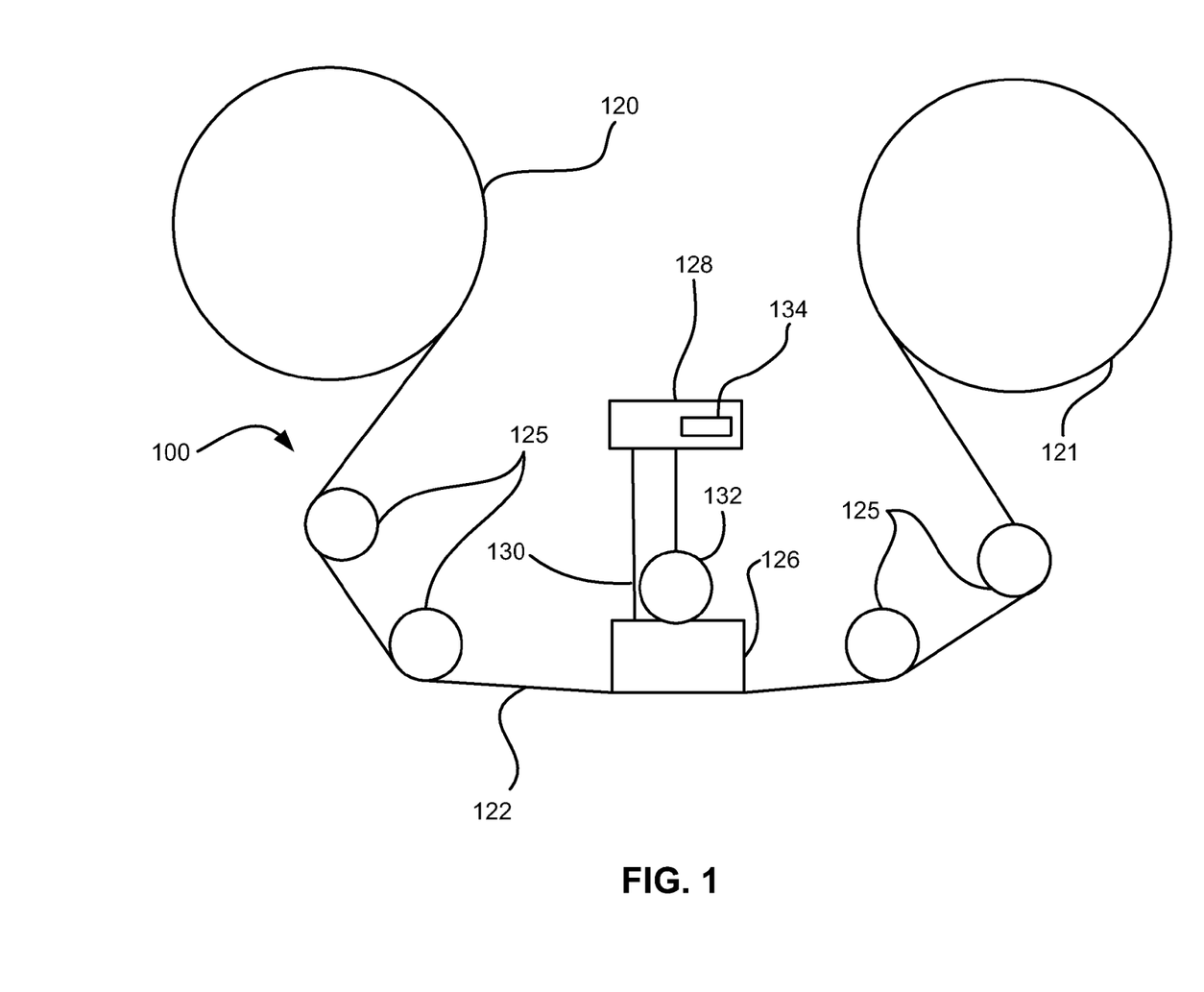
FIG. 1 is a schematic diagram of a simplified tape drive system according to one embodiment.

FIG. 1 illustrates a simplified tape drive 100 of a tape-based data storage system, which may be employed in the context of various embodiments described herein. While one specific implementation of a tape drive is shown in FIG. 1, it should be noted that the embodiments described herein may be implemented in the context of any type of tape drive system.

As shown, a tape supply cartridge 120 and a take-up reel 121 are provided to support a tape 122. One or more of the reels may form part of a removable tape cartridge and are not necessarily part of the system 100, according to some approaches. The tape drive 100, such as that illustrated in FIG. 1, may further include drive motor(s) to drive the tape supply cartridge 120 and the take-up reel 121 to move the tape 122 over a tape head 126. The tape head 126 may be of any type, as known to one of skill in the art.

Guides 125 may position the tape 122 across the tape head 126. The tape head 126 is in turn coupled to a controller assembly 128, possibly via a cable 130. The controller 128 typically controls head functions such as servo following, writing, reading, etc. The cable 130 may include read/write circuits to transmit data to the head 126 to be recorded on the tape 122 and to receive data read by the head 126 from the tape 122. An actuator 132 controls positioning of the head 126 relative to the tape 122.

An interface 134 may also be provided for communication between the tape drive 100 and a host (integral or external, not shown in FIG. 1) to send and receive the data and for controlling the operation of the tape drive 100 and communicating the status of the tape drive 100 to the host, as would be apparent to one of skill in the art upon reading the present descriptions.

Figure 2A:
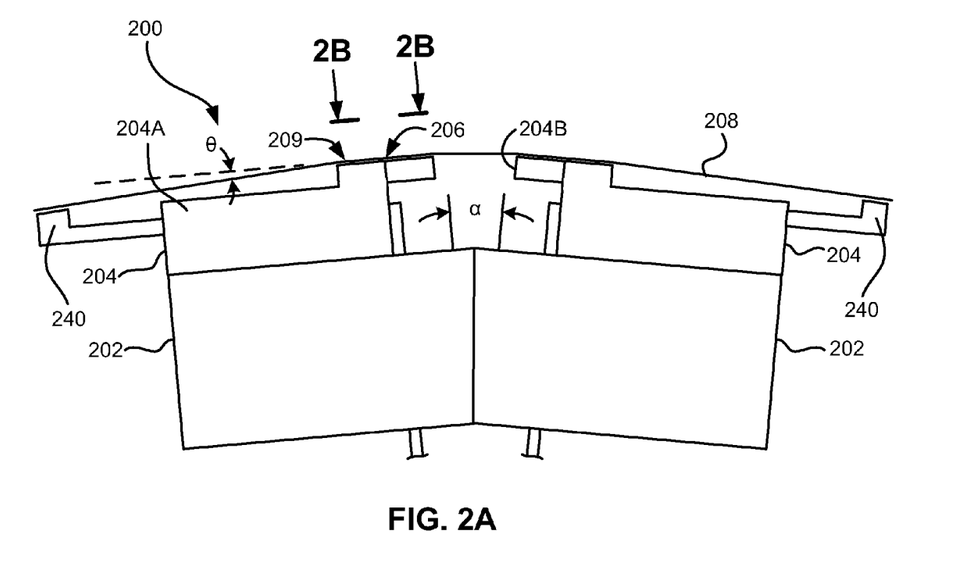
FIG. 2A illustrates a side view of a flat-lapped, bi-directional, two-module magnetic tape head according to one embodiment.

By way of example, FIG. 2A illustrates a side view of a flat-lapped, bi-directional, two-module magnetic tape head 200 according to one embodiment. As shown, the head 200 includes a pair of bases 202, each equipped with a module 204, and fixed at a small angle α with respect to each other. The bases 202 are typically "U-beams" that are adhesively coupled together. Each module 204 includes a substrate 204A and a closure 204B with a gap comprising elements 206 such as readers, writers, and/or servos situated therebetween. In use, a tape 208 is moved over the modules 204 along a media (tape) bearing surface 209, also known as a tape bearing surface (TBS), in the manner shown for reading and/or writing data on the tape 208 using the readers and/or writers. The wrap angle θ of the tape 208 at edges going onto and exiting the flat media support surfaces 209 may be between ⅛ degree and 4½ degrees, according to various embodiments. The modules 204 may also include one or more outriggers 240 that may extend from the modules 204, and which may guide the tape 208 across the TBS, according to some embodiments. The outriggers 240 may be present on either side of the magnetic tape head 200 in a tape travelling direction, according to some approaches. Additionally, the outriggers 240 may help to guide the tape 208 to a desired wrap angle θ.

The substrates 204A are typically constructed of a wear resistant material, such as a ceramic, alumina-titanium carbide ($Al_2O_3$—TiC, herein referred to as AlTiC), alumina, etc. The closures 204B may be made of the same or similar materials as the substrates 204A, or may be constructed of different materials exhibiting good wear resistant characteristics, according to more approaches.

The readers and/or writers may be arranged in a piggyback configuration, in one embodiment. The readers and/or writers may also be arranged in an interleaved configuration, in another embodiment. Alternatively, each array of channels may be readers or writers only. Any of these arrays may include one or more servo readers.

Figure 2B:
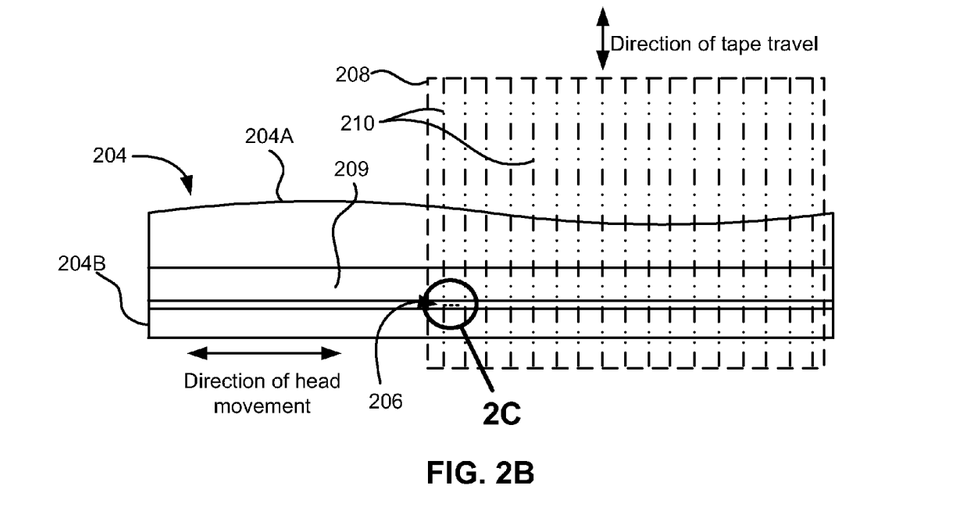
FIG. 2B is a tape bearing surface view taken from Line 2B of FIG. 2A.

FIG. 2B illustrates the TBS 209 of one of the modules 204 taken from Line 2B of FIG. 2A. A representative tape 208 is shown in dashed lines. The module 204 may preferably be long enough, in one approach, to support the tape 208 as the head 200 steps between data bands, as shown between the dashed lines representing servo tracks 210 along the travelling direction of the tape 208.

In this example, the tape 208 includes anywhere from 4-22 data bands, e.g., 16 data bands with 17 servo tracks 210, as shown in FIG. 2B on a one-half inch wide tape 208. The data bands are defined between servo tracks 210. Each data band may include a number of data tracks, for example 64 data tracks, 96 data tracks, 128 data tracks, etc. (not shown). During read/write operations, the elements 206 are positioned within one of the data bands. Outer readers, sometimes called servo readers, read the servo tracks 210. The servo signals are in turn used to keep the elements 206 aligned with a particular track during the read/write operations.

Figure 2C:
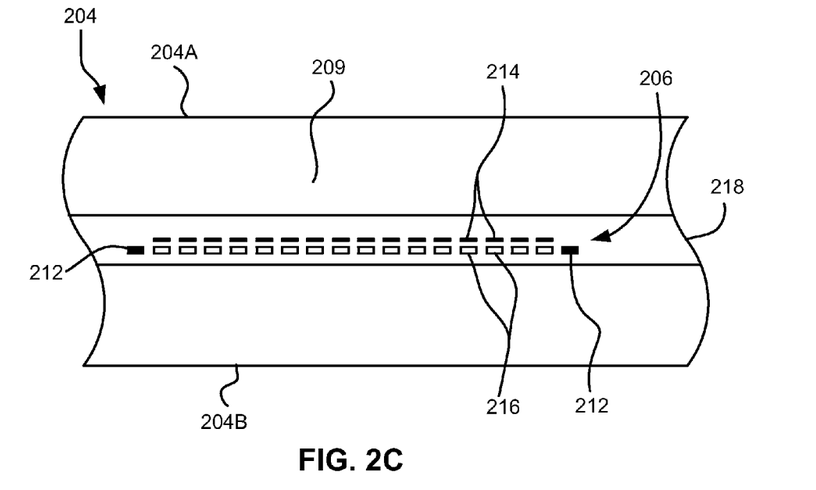
FIG. 2C is a detailed view taken from Circle 2C of FIG. 2B.

FIG. 2C depicts a plurality of read and/or write elements 206 formed in a gap 218 of the module 204 taken from Circle 2C of FIG. 2B. As shown, the array of elements 206 includes, for example, 16 writers 214, 16 readers 216, and two servo readers 212, though the number of elements may vary, according to various embodiments. Illustrative embodiments include 8, 16, 32, and 64 elements 206 per array. A preferred embodiment includes 32 readers per array and/or 32 writers per array. This allows the tape to travel more slowly, thereby reducing speed-induced tracking and mechanical difficulties, as well as reducing wear. While the readers 216 and writers 214 may be arranged in a piggyback configuration as shown in FIG. 2C, the readers 216 and writers 214 may also be arranged in an interleaved configuration or any other configuration as would be known to one of skill in the art. Alternatively, each array of elements 206 may be readers or writers only, and the arrays may contain one or more servo readers 212. As noted by considering FIGS. 2A-2C together, each module 204 may include a complementary set of elements 206 for such things as bi-directional reading and writing, read-while-write capability, backward compatibility, etc.

Figure 2D:
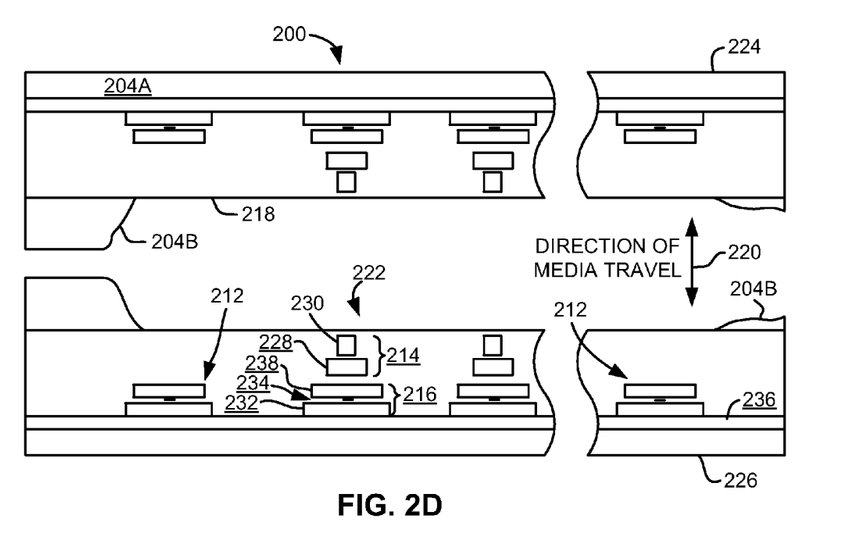
FIG. 2D is a detailed view of a partial tape bearing surface of a pair of modules.

FIG. 2D shows a partial tape bearing surface view of complimentary modules of a magnetic tape head 200 according to another embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, parallel, etc. Servo readers 212 may be positioned on the outside of the array of R/W pairs, the function of which has previously been described.

Generally, the magnetic tape medium moves in either a forward or reverse direction as indicated by arrow 220. The magnetic tape medium and head assembly 200 operate in a transducing relationship in a manner well-known in the art. The piggybacked magnetoresistive (MR) head assembly 200 includes two thin-film modules 224 and 226 of generally identical construction, according to one embodiment.

Modules 224 and 226 may be joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in the following order in one embodiment for the R/W pairs 222: an insulating layer 236, a first shield 232 typically of an iron alloy such as NiFe (permalloy), CZT or Al—Fe—Si (Sendust), a sensor 234 for sensing a data track on a magnetic medium, a second shield 238 typically of a nickel-iron alloy (e.g., 80/20 Permalloy), first and second writer pole tips 228, 230, and a coil (not shown).

The first and second writer poles 228, 230 may be fabricated from high magnetic moment materials such as 45/55 NiFe, in one approach. Note that these materials are provided by way of example only, and other materials may be used. Additional layers such as insulation between the shields and/or pole tips, an insulation layer surrounding the sensor, lubricating layers, overcoat layers, etc., may also be present. Illustrative materials for the insulation layers include alumina and other oxides, insulative polymers, etc.

In some embodiments, a method may include preprofiling (e.g., prior to use) a substrate surface, such as the TBS, of a thin film magnetic head for magnetic writing and/or reading (such as in a tape drive, etc.) to minimize undesirable stiction forces without otherwise changing the head surface. Also, in some embodiments, a method may include recessing some portions of the TBS and filling the recessed portions with a lubricating material. While the descriptions included herein are described with reference to preprofiling substrates for heads used in tape drives, it is understood that the descriptions included herein are applicable to substrates used for other purposes, including substrates used to fabricate heads for other types of magnetic storage drives.

Now referring to FIGS. 3A-3F, a magnetic head that exhibits reduced friction and stiction forces on a surface of the magnetic head is shown according to several embodiments. The method may be carried out in any desired environment, including those shown in FIGS. 1-2D, among others.

Figure 3A:
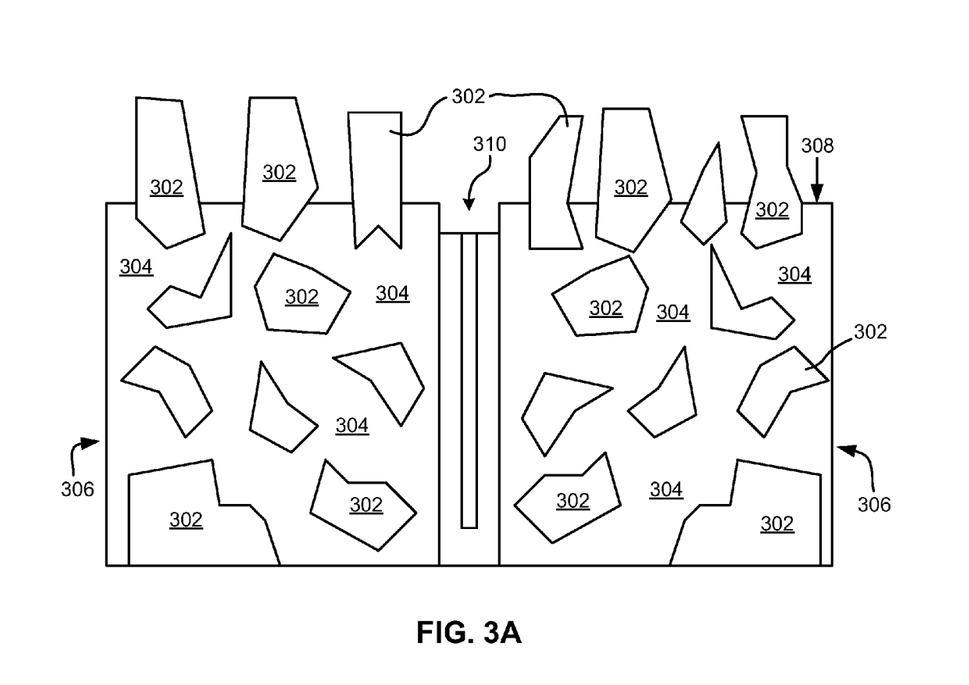
FIG. 3A is a schematic diagram of a surface portion of a magnetic head, according to one embodiment.

FIG. 3A illustrates a preferred profile of a substrate 306 from which a thin film magnetic head may be fabricated, according to one embodiment. As discussed above, common wafer materials include alumina-titanium carbide (AlTiC) composites, which typically comprise about 30-35% by weight TiC. While the descriptions included herein are described with reference to AlTiC composite substrates, it is understood that the descriptions included herein are not limited to AlTiC composites and are applicable to other wafer substrate materials known in the art having selectively removable grains. Of course, many other materials are possible for use as a substrate, as would be apparent to one of skill in the art upon reading the present descriptions.

Figure 3B:
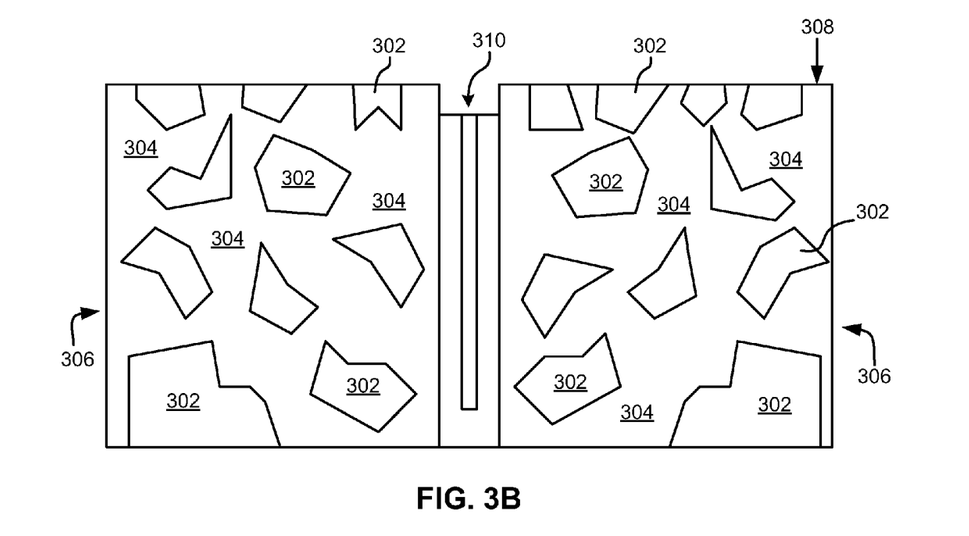
FIG. 3B is a schematic diagram of a surface portion of a magnetic head, according to one embodiment.
Figure 3C:
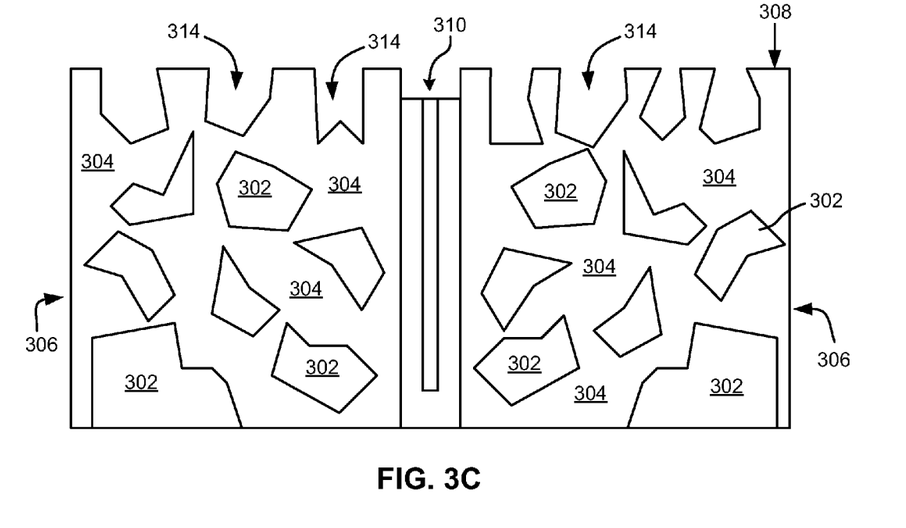
FIG. 3C is a schematic diagram of a surface portion of a magnetic head, according to one embodiment.

The surface 308 of the wafer substrate 306 corresponds to the TBS of the tape head that will be facing a magnetic tape during operation. The surface 308 may be preprofiled prior to use in a tape drive, or the like, so that the TiC grains 302 are recessed about down to the surface 308 of the surrounding alumina 304, as shown in FIG. 3B, according to one embodiment, or below the surface 308 in other embodiments. In another embodiment, as shown in FIG. 3C, the TiC grains 302 may be completely removed at the surface 308, instead of simply recessed by some amount. An amount of the TiC grains 302 that are removed may depend on a length of time of exposure to the oxidant, and/or a strength of the oxidant, in more approaches. After removal or recession of the TiC grains 302 from the surface 308, recessed portions 314 exist at the surface 308.

In one embodiment, the preprofiling may be performed by polishing, etching, etc.

In another embodiment, the preprofiling of the TBS 308 may be performed by contacting an oxidant with an AlTiC portion of the magnetic head for recessing TiC grains 302 of the AlTiC portion. This may include a chemical etching process, where exposed TiC grains 302 at the surface 308 of the substrate 306 may be dissolved after being soaked for a period of time in the oxidant. In this and other embodiments, recessing the TiC grains 302 may include both recession of TiC grains 302 by removal of a portion thereof, as well as complete removal of TiC grains 302 near the surface 308 of the wafer substrate 306. Note that the resultant profile of the AlTiC substrate 306 after the etching or removal process is fairly benign since the head eventually reaches this profile after a sufficient amount of tape wear during use of the head.

Any type of oxidant may be used. In some preferred embodiments, the oxidant may be a peroxide, such as hydrogen peroxide ($H_2O_2$), or any other peroxide as would be known to one of skill in the art, such as magnesium peroxide, calcium peroxide, etc.

In some approaches, the oxidant may be selected from a group comprising a hypohalite compound such as hypochlorite, a halogen such as iodine, a halogen compound such as chlorite, chlorate, perchlorate, and other analogous halogen compounds, a permanganate salt, ammonium cerium (IV) nitrate, a hexavalent chromium compound (such as chromic acids, dichromic acids, and chromium trioxide), Pyridinium chlorochromate (PCC), and chromate/dichromate compounds, Tollen's Reagent, a sulfoxide, persulfuric acid, ozone, osmium tetroxide ($OsO_4$), nitric acid, nitrous oxide ($N_2O$), etc.

In some more approaches, the oxidant may be present in a liquid composition, wherein a reaction product of the TiC with the oxidant dissolves into the liquid composition. In even more approaches, mixtures of oxidants may be used.

It should be noted that if the write/read elements may react negatively to chemical etching, the active region of the head (which occurs in the gap 310) can be protected prior to the etching process by applying a coating thereover, such as a carbon coating, photoresist, or some other coating. It may also be advantageous to use such a coating to prevent certain regions from etching so that some portions of the head are left with a well-known head-tape-interface while other portions have a roughened surface.

Because stiction and friction forces depend upon the surface of the media (e.g., tape), humidity, media lubrication and other factors, the amount of TiC recessed from the surface 308 may vary, but is intended to be a depth such that an amount of lubrication may be placed in the recessed portions 314 that will not easily be removed during use of the magnetic head. In some preferred embodiments, the TiC grains 302 may be recessed below the surface 308 of the surrounding alumina 304 by a depth between about 1 nm to in excess of about 30 nm, and more preferably between about 15 nm and about 20 nm. In some preferred approaches, the TiC grains 302 may be recessed at least about 5 nm, alternatively at least about 10 nm, from an TBS 308 of the AlTiC portion. The surface roughness Ra may be preferably between about 5 nm and about 7 nm.

The recession may be measured for sample holes individually or cumulatively, may be measured relative to a plane extending along a media surface 308 of the AlTiC portion, etc. In one approach, such a plane may be discerned, for example, by placing the TBS 308 on an optical flat or other flat surface after the etching.

By preprofiling the surface 308 of the wafer substrate 306 prior to use, undesirable stiction forces at the head-to-tape interface (HTI) are minimized without otherwise modifying the head surface (e.g., beveling, roughening and/or patterning), which can have adverse affects, cause performance degradations, and increase costs and manufacturing time. In addition, such preprofiling of the surface 308 of the wafer substrate 306 reduces the TiC material near the surface 308 such that the amount of undesirable free body particles at the HTI is minimized.

Other methods may be utilized to preprofile the surface 308 of the substrate 306 so that the TiC grains 302 are recessed below the surface of the surrounding alumina 304. For example, the surface 308 of the wafer substrate 306 may be preprofiled using conventional ion milling or sputtering techniques in which an ion beam is directed on the TiC grains 302 protruding from the surface 308. Portions of the TiC grains 302 exposed to the ion beam may be eroded due to transfer of momentum from the ions to the TiC particles 302 constituting the exposed surface. The ion beam may be produced by any method known to one of skill in the art, such as an ion gun in which a suitable gas, such as argon, is ionized by electron impact and in which the ions so produced are accelerated through a stationary electric field.

Similarly, a reactive ion etching ("RIE") process may be used according to some embodiments to preprofile the surface 308 of the substrate 306 by using chemically reactive plasma to etch or otherwise remove portions of the exposed TiC grains 302 from the surrounding alumina 304 at the surface 308. The plasma may be generated in a vacuum by an electromagnetic field and high energy ions from the plasma may react with the exposed TiC grains 302 on the surface 308.

The surface 308 of the substrate 308 may also be preprofiled to recess exposed TiC grains 302 below the surrounding alumina 304 by running abrasive media, e.g., chromium, diamond tape, diamond like carbon (DLC), etc., over the surface 308 in some embodiments.

While various methods for preprofiling the surface 308 of the wafer substrate 306 have been described, it is understood that this invention is not limited to the specific methods described herein and that other preprofiling techniques may be utilized to recess exposed TiC grains 302 below the surface of the surrounding alumina 304. Moreover, combinations of the foregoing may also be used.

In some more approaches, the AlTiC portion 306 may be a substrate of the thin film portion, a substrate of the closures, a substrate of the outriggers, etc. Any or all of the surfaces of these substrates may have recessed TiC grains in an AlTiC portion, with a lubricating layer provided thereon that fills the recessed portions of the AlTiC portion.

In another embodiment, the AlTiC portion 306 may be at least one of a closure, an outrigger, and a substrate of the thin film portion.

Figure 3D:
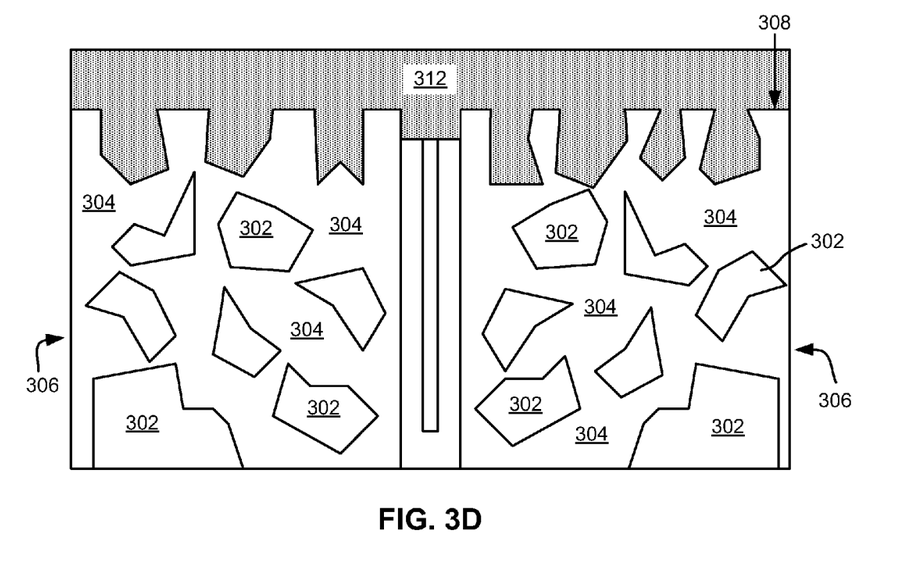
FIG. 3D is a schematic diagram of a surface portion of a magnetic head, according to one embodiment.

Now referring to FIG. 3D, after the surface 308 has been preprofiled, whether the TiC grains 302 have been completely removed or only recessed by some amount, a lubricating layer 312 may be added to the surface 308.

According to one embodiment, a mask (not shown) may be formed over the gap 310 in order to protect the thin film elements existing therein prior to applying the lubricating layer 312. Of course, this mask is not necessary, and if a lubricating layer 312 is desired over the thin film elements, then this mask is not formed.

In more embodiments, if different lubricating layers are to be formed, masks may be used to cover portions of the surface 308 which are going to be coated with a different lubricating layer prior to exposure of the TiC grains 302 at the surface 308 to the oxidant. Then, after application of the first lubricating layer and optionally lapping of excess lubricant from the surface 308, the masks may be removed and a second lubricating layer may be applied, which would fill the remaining recessed portions 314. Then, lapping may optionally be repeated to remove the excess second lubricating layer.

The lubricating layer 312 may be added to the surface 308, such that each recessed portion 314 is filled completely with a lubricant in the lubricating layer 312. According to some embodiments, the lubricant that comprises the lubricating layer 312 may be a semi-solid lubricant of a type known in the art, and may be similar to the lubrication currently used on some tape media, e.g., pig fat. Some exemplary lubricants include DLC, fluorinated materials such as polytetrafluoroethylene (PTFE), etc., silicon nitrides (SiN), among others. In more embodiments, the lubricant may be a mixture of different lubricants. In even further embodiments, different lubricants may be applied to different portions of the surface 308. For example, one type of lubricant may be applied to outriggers of the magnetic head, while a different type of lubricant may be applied to closures of the magnetic head. Of course, many different configurations will be apparent to one of skill in the art upon reading the present descriptions.

Figure 3E:
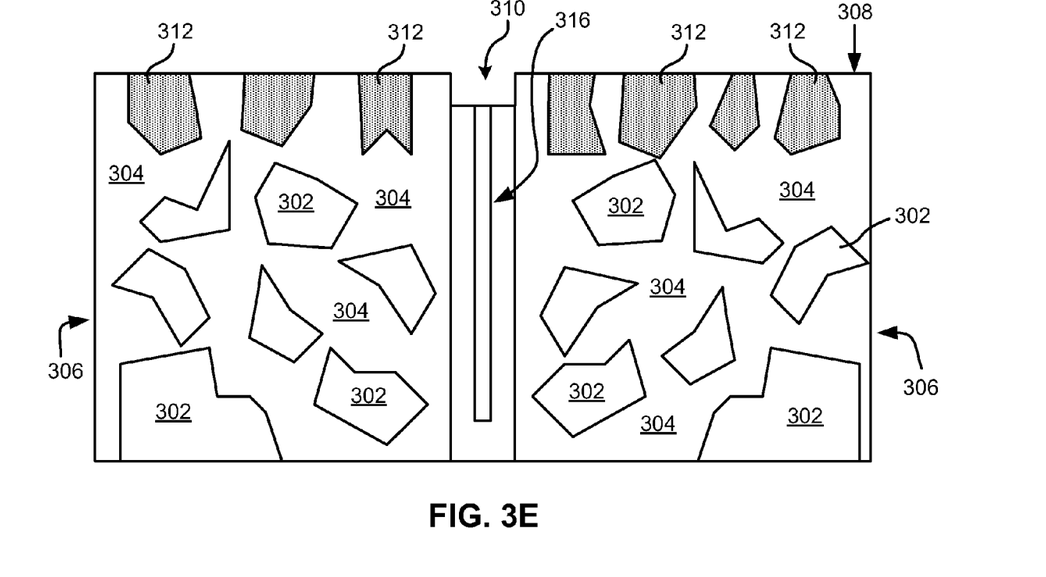
FIG. 3E is a schematic diagram of a surface portion of a magnetic head, according to one embodiment.

Now referring to FIG. 3E, a magnetic head having a lubricating layer 312 applied that reduces friction and stiction forces and will not remove easily with use is shown after lapping of the excess lubricating layer 312 from the surface 308, according to one embodiment. In this embodiment, the gap 310 has not had lubricant applied, possibly through a masking step as described previously. Of course, lapping is not necessary if the excess lubricating layer 312 is not troublesome or is actually desired.

Figure 3F:
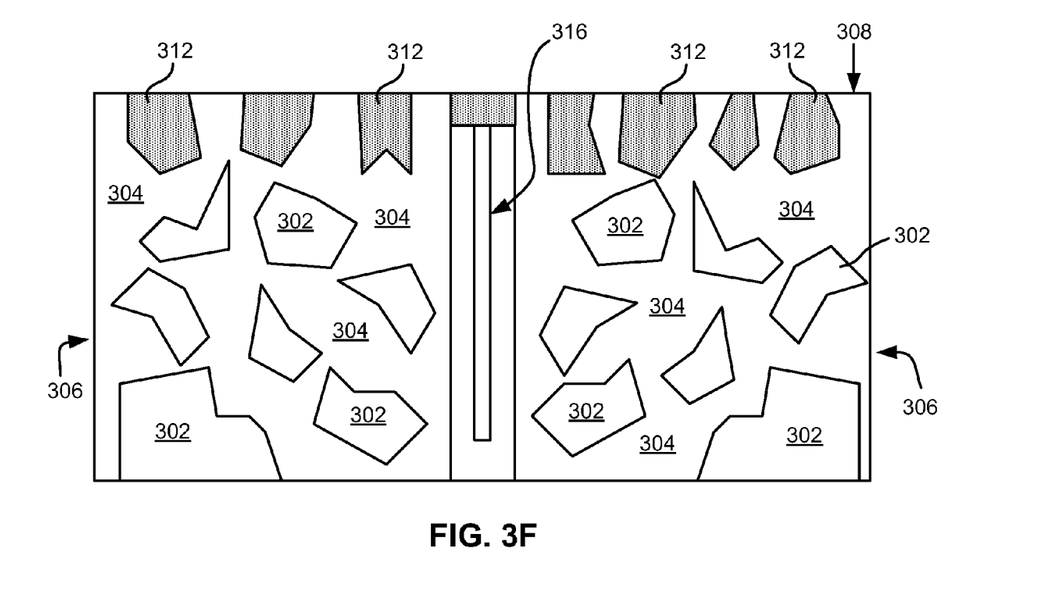
FIG. 3F is a schematic diagram of a surface portion of a magnetic head, according to one embodiment.

With reference to FIG. 3F, a magnetic head having a lubricating layer 312 applied that reduces friction and stiction forces and will not remove easily with use is shown after lapping of the excess lubricating layer 312 from the surface 308, according to another embodiment. In this embodiment, the gap 310 has lubricant applied. Of course, lapping is not necessary if the excess lubricating layer 312 is not troublesome or is actually desired.

In further embodiments, lubricant may be applied as described in FIGS. 3A-3D to any surface of the magnetic head, such as the closure, the outriggers, etc.

In some different embodiments, the methods described above may be included in the development of a magnetic head. For example, in some embodiments, a magnetic head may comprise an AlTiC portion 306 having an TBS 308. Also, the magnetic head may include a thin film portion (in the gap 310) coupled to the AlTiC portion 306, wherein TiC grains 302 of the AlTiC portion 306 may be recessed from the TBS 308. Accordingly, the TBS 308 of the AlTiC portion 306 is primarily or entirely Al-containing material (excluding impurities).

Now referring to FIGS. 3A-3F, according to one embodiment, a magnetic tape head includes a first section (such as 306) having a TBS 308 and portions that are recessed from the TBS 314, a thin film section 316 coupled to the first section, the thin film section 316 having any number of transducers for at least one of reading from and writing to a magnetic tape, and a lubricating layer 312 above at least the first section 306.

According to various embodiments, the first section 306 may be a substrate of the thin film section, a closure, an outrigger, etc.

In one embodiment, sidewalls of the recessed portions 314 have shapes characteristic of dissolution of material previously positioned therebetween. In further embodiments, the first section 306 may be constructed of any material as would be apparent to one of skill in the art upon reading the present descriptions. In one preferred embodiment, the first section 306 comprises AlTiC, and the material previously positioned between the sidewalls of the recessed portions comprises TiC grains of AlTiC.

According to another embodiment, the first section 306 may be a substrate of the thin film section 316, and the head may further include a closure coupled to the thin film section 306 and a lubricating layer above at least a portion of the closure. The closure may have a TBS and portions that are recessed from the closure TBS, sidewalls of the recessed portions of the closure may have shapes characteristic of dissolution of material previously positioned therebetween, the closure may include AlTiC, and the material previously positioned between the sidewalls of the recessed portions of the closure may include TiC grains of AlTiC, according to one embodiment. In some embodiments, the lubricating layer 312 may be present in the recessed portions of the closure.

In another embodiment, the magnetic tape head may further include an outrigger and a lubricating layer 312 above at least a portion of the outrigger. The outrigger may have a TBS and portions that are recessed from the outrigger TBS, sidewalls of the recessed portions of the outrigger may have shapes characteristic of dissolution of material previously positioned therebetween, the outrigger may include AlTiC, and the material previously positioned between the sidewalls of the recessed portions of the outrigger may include TiC grains of AlTiC. In some embodiments, the lubricating layer 312 may be present in the recessed portions of the outrigger.

For positioning of the closure, substrate, and/or outrigger, please refer to FIG. 2A.

In another approach, the first section 306 may be an outrigger, and a substrate of the thin film section 316 may be adjacent the TBS. In this approach, the lubricating layer 312 may or may not be above the substrate of the thin film section 316. In addition, a closure may also be present, which may or may not have a lubricating layer 312 thereon.

According to another approach, the first section 306 may be a closure, and a substrate adjacent the thin film section 316 may be present. The lubricating layer 312 may or may not be above the substrate of the thin film section 316. In addition, an outrigger may also be present, which may or may not have a lubricating layer 312 thereon.

Figure 5A:
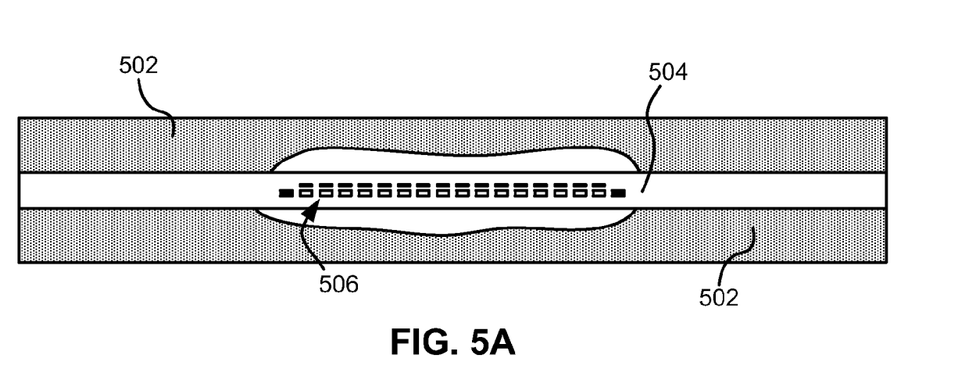
FIG. 5A is a schematic diagram of a portion of a magnetic head, according to one embodiment.
Figure 5B:
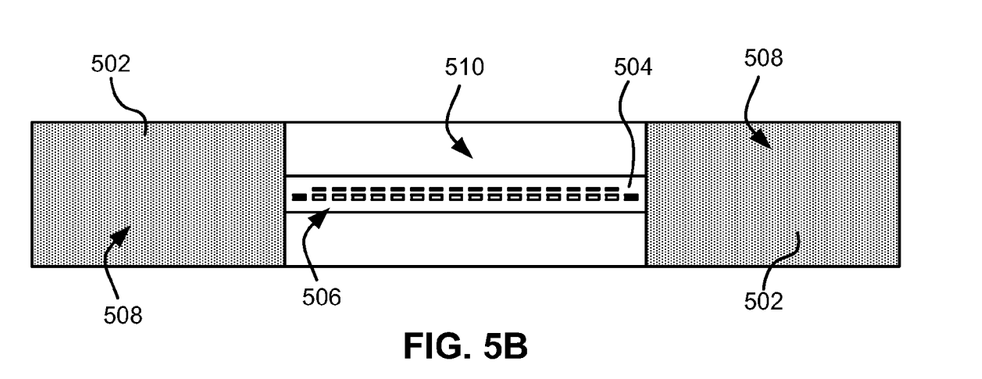
FIG. 5B is a schematic diagram of a portion of a magnetic head, according to another embodiment.
Figure 5C:
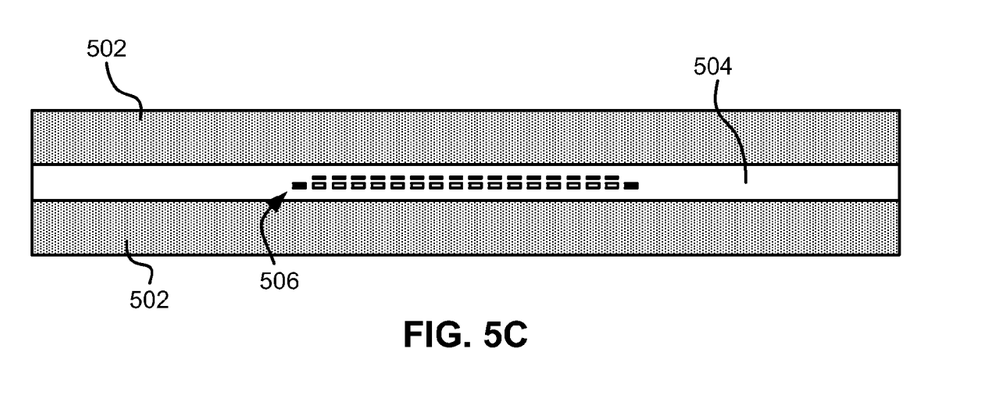
FIG. 5C is a schematic diagram of a portion of a magnetic head, according to yet another embodiment.

Now referring to FIGS. 5A-5C, additional embodiments are described. In any of the embodiments described below, the portions of the members which do not have a lubricating layer thereon may have been masked prior to applying the lubricating layer, and then the mask removed to reveal the surface without the lubricating layer. As would be apparent to one of skill in the art upon reading the present descriptions, many other masking arrangements are possible, along with masking arrangements on other portions of a magnetic head, such as a closure, a thin film substrate, an outrigger, etc. Of course, other methods of segregating the lubricating layer may also be used, as known in the art.

In one embodiment, the lubricating layer 502 may not be above a portion of the thin film section 504 having the transducers 506. In FIG. 5A, this portion may be just in an area surrounding the transducers 506.

Referring to FIG. 5B, in another embodiment, the lubricating layer 502 may not be above a central portion 510 of the first section aligned with the portion of the thin film section 504 having the transducers 506 in a direction of tape travel thereacross. In addition, outer portions 508 of the first section flanking the central portion 510 of the first section have the lubricating layer 502 thereabove.

In yet another embodiment, referring to FIG. 5C, the first section may be a closure, and a substrate adjacent the thin film section 504 may be present. The substrate may have a TBS and portions that are recessed from the substrate TBS, sidewalls of the recessed portions of the substrate may have shapes characteristic of dissolution of material previously positioned therebetween, and the lubricating layer 502 may not be above the thin film section 504, and the lubricating layer 502 may be above the substrate.

Figure 4:
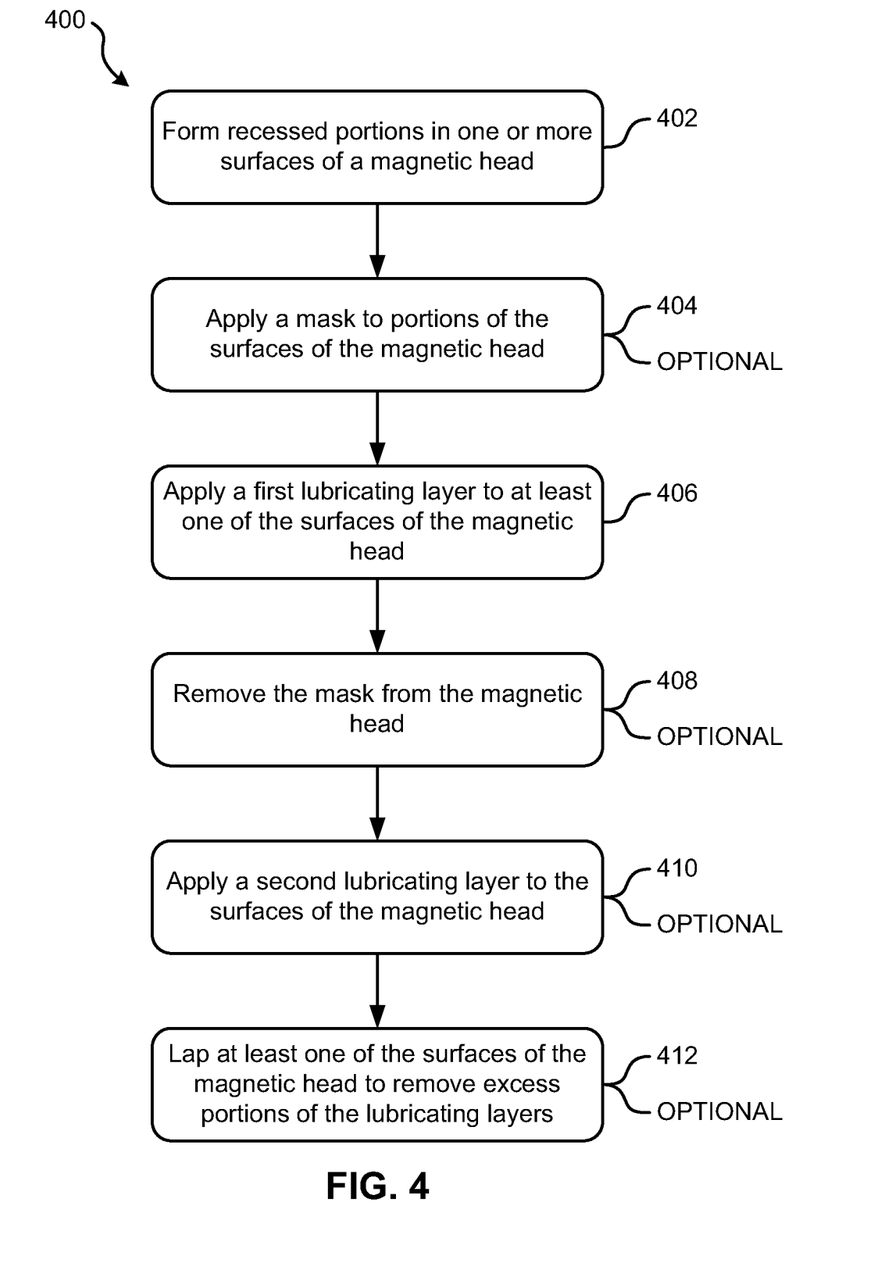
FIG. 4 is a flowchart of a method, according to one embodiment.

Now referring to FIG. 4, a method 400 is shown according to one embodiment. The method 400 may be carried out in any desired environment, including those shown in FIGS. 1-3F, according to various embodiments. The method 400 may include more or less operations than are shown in FIG. 4, as would be apparent to one of skill in the art upon reading the present descriptions.

In operation 402, recessed portions are formed in one or more surfaces of a magnetic head.

According to one embodiment, the pits may be formed by removing or recessing surface exposed TiC grains from a surface of the magnetic head. In a further embodiment, the surface exposed TiC grains may be removed by exposing the surface of the magnetic head to an oxidant.

According to a preferred embodiment, the oxidant may be hydrogen peroxide. The surfaces of the magnetic head may be exposed to the hydrogen peroxide for a period of time sufficient to recess or remove the TiC grains from the surfaces of the magnetic head.

In optional operation 404, a mask is applied to portions of the surfaces of the magnetic head. In one embodiment, a mask may be applied to a portion of the magnetic head which includes the gap where the read and/or write elements are located. In another embodiment, a mask may be applied to the substrate and gap, but not to the outriggers of a magnetic head. Of course, many other arrangements are possible as would be apparent to one of skill in the art upon reading the present descriptions.

In operation 406, a first lubricating layer is applied to at least one of the surfaces of the magnetic head, thereby at least filling in the recessed portions in the surfaces of the magnetic head. The first lubricating layer may also covers portions of the magnetic head which are not recessed.

According to one embodiment, the first lubricating layer may comprise a semi-solid lubricant, of a type known in the art. Some exemplary lubricants include DLC, fluorinated materials such as polytetrafluoroethylene (PTFE), etc., silicon nitrides (SiN), among others.

In optional operation 408, the mask is removed from the magnetic head. This operation may reveal recessed portions of the magnetic head that were covered by the mask previously. With the mask, portions of the lubricating layer may also be removed, thereby exposing surfaces of the magnetic head which do not have a lubricating layer thereon. In one embodiment, the gap may be left uncovered by the first lubricating layer. In another embodiment, the outriggers may be the only portion of the magnetic head which have a lubricating layer thereon after removal of the mask.

In optional operation 410, a second lubricating layer is applied to surfaces of the magnetic head. The second lubricating layer may be the same or different from the first lubricating layer. Additionally, the lubricating layers may complement each other, such as by providing different beneficial aspects to the surface of the magnetic tape head. Such aspects may include planarity, smoothness, abrasion resistance, etc.

In optional operation 412, at least one of the surfaces of the magnetic head are lapped to remove excess portions of the lubricating layers. This may provide for a surface profile where the recessed portions of the magnetic head are filled with a lubricant and the non-recessed portions may comprise alumina and share a surface plane with the portions filled with the lubricant, according to one embodiment. In this way, the surface has a replenishing supply of lubricant that can relubricate the surface of the magnetic head as lubricant is worn off during operation of the magnetic tape drive.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed herein.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A data storage system, comprising:
   a magnetic tape head having a first section having a tape bearing surface (TBS) and portions that are recessed from the TBS, a thin film section coupled to the first section, the thin film section comprising transducers for at least one of reading from and writing to a magnetic tape, and a lubricating layer above at least the first section;
   a drive mechanism for passing a magnetic medium over the magnetic tape head; and
   a controller electrically coupled to the magnetic tape head.

2. A data storage system as recited in claim 1, wherein sidewalls of the recessed portions have shapes characteristic of dissolution of material previously positioned therebetween.

3. A magnetic tape head as recited in claim 2, wherein the first section comprises AlTiC, and wherein the material previously positioned between the sidewalls of the recessed portions comprises TiC grains of AlTiC.

4. A data storage system as recited in claim 1, wherein the first section is a substrate of the thin film section, the magnetic tape head further comprising:
   a closure coupled to the thin film section; and
   a second lubricating layer above at least a portion of the closure,
   wherein the closure has a TBS and portions that are recessed from the closure TBS,
   wherein sidewalls of the recessed portions of the closure have shapes characteristic of dissolution of material previously positioned therebetween
   wherein the closure comprises AlTiC, and
   wherein the material previously positioned between the sidewalls of the recessed portions of the closure comprise TiC grains of AlTiC.

5. A data storage system as recited in claim 1, further comprising:
   an outrigger; and
   a second lubricating layer above at least a portion of the outrigger,
   wherein the outrigger has a TBS and portions that are recessed from the outrigger TBS,
   wherein sidewalls of the recessed portions of the outrigger have shapes characteristic of dissolution of material previously positioned therebetween
   wherein the outrigger comprises AlTiC, and
   wherein the material previously positioned between the sidewalls of the recessed portions of the outrigger comprise TiC grains of AlTiC.

6. A data storage system as recited in claim 1, wherein the first section is an outrigger, and wherein the magnetic tape head further comprises a substrate of the thin film section adjacent the TBS, wherein the lubricating layer is not above the substrate of the thin film section.

7. A data storage system as recited in claim 1, wherein the first section is a closure, and wherein the magnetic tape head further comprises a substrate adjacent the thin film section, wherein the lubricating layer is not above the substrate of the thin film section.

8. A data storage system as recited in claim 1, wherein the lubricating layer is not above a portion of the thin film section having the transducers.

9. A magnetic tape head as recited in claim 8, wherein the lubricating layer is not above a central portion of the first section aligned with the portion of the thin film section having the transducers in a direction of tape travel thereacross,
   wherein outer portions of the first section flanking the central portion of the first section have the lubricating layer thereabove.

10. A data storage system as recited in claim 1, wherein the first section is a closure, and wherein the magnetic tape head further comprises a substrate adjacent the thin film section, wherein the substrate has a TBS and portions that are recessed from the substrate TBS, wherein sidewalls of the recessed portions of the substrate have shapes characteristic of dissolution of material previously positioned therebetween, wherein the lubricating layer is not above the thin film section, and wherein the lubricating layer is above the substrate.

11. A data storage system as recited in claim 1, wherein the lubricating layer comprises a semi-solid lubricant.

12. A magnetic head, comprising:
   an AlTiC section having a tape bearing surface (TBS) and portions that are recessed from the TBS; and
   a thin film section coupled to the AlTiC section, the thin film section comprising transducers for at least one of reading from and writing to a magnetic tape;
   wherein sidewalls of the recessed portions have shapes characteristic of dissolution of material previously positioned therebetween,
   wherein the material previously positioned between the sidewalls comprises TiC grains of AlTiC, and wherein the TBS of the AlTiC section comprises primarily Al-containing grains.

13. A magnetic tape head as recited in claim 12, wherein the AlTiC section is a substrate of the thin film section, and further comprising:
 an outrigger having a TBS and portions that are recessed from the outrigger TBS; and
 a second lubricating layer in the recessed portions of the outrigger,
 wherein sidewalls of the recessed portions of the outrigger have shapes characteristic of dissolution of material previously positioned therebetween, and
 wherein the outrigger comprises AlTiC and the material previously positioned between the sidewalls of the recessed portions of the outrigger comprise TiC grains of AlTiC.

14. A data storage system, comprising:
 a magnetic tape head as recited in claim 12;
 a drive mechanism for passing a magnetic medium over the magnetic tape head; and
 a controller electrically coupled to the magnetic tape head.

15. A method, comprising:
 forming recessed portions in one or more surfaces of a magnetic tape head; and
 applying a first lubricating layer to at least one of the surfaces of the magnetic tape head to at least partially fill the recessed portions,
 wherein the forming comprises contacting an oxidant with an AlTiC portion of the magnetic tape head for recessing TiC grains from a surface of the AlTiC portion.

16. A method as recited in claim 15, wherein the recessed portions include some amount of the first lubricating layer after application thereof, wherein the oxidant is selected from a group consisting of a hypohalite compound, a halogen, a halogen compound, a permanganate salt, ammonium cerium (IV) nitrate, a hexavalent chromium compound, Tollen's Reagent, a sulfoxide, persulfuric acid, ozone, osmium tetroxide ($OsO_4$), nitric acid, nitrous oxide ($N_2O$).

17. A method as recited in claim 15, further comprising:
 applying a mask to portions of the surfaces of the magnetic tape head prior to applying the first lubricating layer; and
 removing the mask from the magnetic tape head after applying the first lubricating layer.

18. A method as recited in claim 17, further comprising:
 applying a second lubricating layer to at least one of the surfaces of the magnetic tape head; and
 lapping at least one of the surfaces of the magnetic tape head to remove excess portions of the first and second lubricating layers.

* * * * *